3,322,632
PROCESS FOR STABILIZING BIOLOGICALLY ACTIVE MATERIALS WITH MODIFIED COLLAGEN HYDROLYZATE
Hans Gerhard Schwick and Hans Schweinsberg, Marburg (Lahn), Germany, assignors to Behringwerke Aktiengesellschaft, Marburg (Lahn), Germany, a corporation of Germany
No Drawing. Filed Dec. 20, 1963, Ser. No. 332,994
Claims priority, application Germany, Dec. 21, 1962, B 70,095
6 Claims. (Cl. 167—78)

The present invention relates to a process for stabilizing biologically active materials such as bacteria, bacterial metabolites, viruses, sera and enzymes.

Many biologically active materials lose their potency partially or completely, when dissolved, freeze-dried or stored. Therefore, attempts have been made to improve the stability and storability of such materials by adding a stabilizer. However, no stabilizer which could be generally used for the stabilization of bacteria, bacterial metabolites, viruses, sera and enzymes, and which could remain in the solution of the biologically active substance even if this solution were used intravenously, has heretofore been known.

For vaccines to be valuable products, they must be standard preparations having a potency that remains constant over a prolonged period of time. The stability of the biologically active substances must also be maintained during the preparation of the vaccines. Thus, for example, in order to stabilize polio-virus containing suspensions during the production of polio vaccines, the poliovirus suspensions have heretofore been frozen and then stored in deep-freeze chambers. This method of stabilizing between the various steps of preparation is very expensive. Stability furthermore plays an important role for antibody-containing sera and enzymes, especially those used in the form of solutions in permanent drop infusions at about 20° C. Streptokinase, a metabolite of several streptococci strains, which is able to dissolve fibrin thromboses by converting plasminogen into plasmin and which is therefore of utmost importance in the therapy of venous and arterial thromboses, thrombophlebitides and pulmonary emboli, loses its potency during storage, even when stored in dry state, at a temperature of 4° C., especially at higher temperatures, for example, those to which it is exposed during transportation into the tropics. Hitherto, such shipments have always involved a loss of activity in the material.

Now, we have found a process for stabilizing biologically active materials such as bacteria, bacterial metabolites, viruses, pera, and enzymes, wherein 0.5–5.0 percent of a material containing urea-alkylene-urea groups and obtained by the process described in German Patent 1,118,792 by hydrolytic degradation of collagen, preferably gelatin, to a molecular weight of 2000 to 20,000, preferably 5000 to 10,000, and then cross-linking with a diisocyanate to have a molecular weight of about 15,000 to 60,000, or obtained according to the process described in U.S. Patent 3,057,782 by cross-linking collagen, preferably gelatin, with a diisocyanate followed by hydrolytic degradation to a molecular weight of, for example, 15,000 to 60,000, preferably in combination with 0.5–5.0% of sodium-L-glutaminate, is added to the said biologically active materials.

The collagen degradation product cross-linked with diisocyanate has the advantage that it has no antigenic properties.

The following examples which are intended for the purpose of illustration of the process of the invention and not for limitation, show that the biologically active materials stabilized according to the invention retain their biological activity in solution, in freeze-dried state or during storage.

The examples refer to the stabilization of bacterial preparations [Pertussis, Bacillus Calmette Guérin (BCG)], metabolites of bacteria (diphtheria and tetanus toxoid, tuberculin), viruses (polioviruses of all three types), sera (rickettsiosis antiserum) and enzymes (plasmin, streptokinase). As is also shown in the examples (cf. diphtheria and tetanus toxoid), the substances used as vaccine may contain in known manner an adjuvant, for example, aluminium hydroxide, for increasing the antigenicity.

Example 1.—Pertussis germs 500 cc. of a 3.5% solution of the gelatin degradation product obtained according to Example 1 of German Patent 1,118,792 and cross-linked with hexamethylene-diisocyanate, were added to 500 cc. of a suspension of pertussis germs having a titer of $30 \times 10^9$ germs per cc. and showing in the mouse protection test (Kendrick test) an average of 20 units of protection per cc. (hereinafter referred to as UP), and the whole was then freeze-dried.

A corresponding suspension of pertussis germs was freeze-dried for the purpose of comparison.

In mouse protection tests carried out with the freeze-dried products, which had been dissolved in equal volumes of distilled water for the tests, it was found that the preparation without the product of degraded gelatin cross-linked with diisocyanate had an average of 4.5 UP, whereas the preparation with the additive had an average of 18 UP.

Example 2.—Bacillus Calmette Guerin (BCG)
(with combined stabilizer)

(A) 0.5% of the stabilizer used in Example 1 and 2% of sodium-L-glutaminate were added to 300 cc. of a BCG-containing suspension containing per cc. 5 mg. of BCG germs, the suspension was then filled in ampules, freeze-dried and closed by melting under reduced pressure. The number of live germs per milligram of dry substance was $17.0 \times 10^6$.

The ampules prepared in the above manner were stored at 37° C. After 2 months, the number of germs capable of reproduction was determined. It was found to be after this time $2.7 \times 10^6$ per mg., thus 15% of the quantity used initially.

The BCG vaccine thus obtained was readily soluble, easy to handle and had after a storage period of 2 months at 37° C. a titer of BCG germs capable of reproduction sufficient for protective vaccination.

(B) A BCG dry vaccine prepared in known manner for the purpose of comparison, containing 15% of lactose and 1.5% of sodium-L-glutaminate, had after storage for 2 months at 37° C. a titer of $0.2 \times 10^6$ BCG germs capable of reproduction per mg. of dry vaccine. Hence, the additives used did not sufficiently stabilize the BCG vaccine, so that after 2 months it was no longer suitable for protective vaccination.

(C) Drying of the BCG-germs without any additive is not possible, because they cannot be suspended thereafter.

Example 3.—Diphtheria and tetanus toxoid 100 cc. of a solution of 3.5% strength of a gelatin degradation product cross-linked with hexamethylene-diisocyanate were added to 100 cc. of a diphtheria-tetanus combination vaccine containing 0.2% of $Al(OH)_3$ as in Example 1. A further 100 cc. of the same vaccine were diluted with 100 cc. of a sodium chloride solution of 0.85% strength. The solutions were then freeze-dried and after solution of the freeze-dried products the units of protection against diphtheria and tetanus were determined.

The data obtained are compared in the following table, the values in brackets showing the range of dispersion:

|  | UP against diphtheria | UP against tetanus |
|---|---|---|
| With gelatin degradation product cross-linked with diisocyanate | 120(100–150) | 120(100–150) |
| With NaCl | 58(44–75) | 26(20–34) |

It is evident from the above table that the NaCl values are remarkably reduced, whereas the values obtained using the stabilizer of the present invention prove the good action of this stabilizer on diphtheria and tetanus toxoid.

Example 4.—Poliomyelitis virus type I/Mahoney at 20° C.

2.6% of a physiological (0.85%) sodium chloride solution of the stabilizer used in Example 1 were added to 100 cc. of a suspension of poliovirus type I/Mahoney, having a titer of $10^{7.896}$ $ID_{50}$/cc., the whole was then stored for 9 weeks at 20° C. and then the titer was again determined. It was found to be $10^{6.589}$ $ID_{50}$/cc.

Another solution without stabilizer stored for comparison at 20° C. exhibited after 8 weeks a titer of $10^{2.0}$ $ID_{50}$/cc.

Example 5.—Poliomyelitis virus type I/Mahoney at 37° C.

A poliovirus suspension like that described in Example 4 was stored for 21 days at 37° C. After this time, the suspension containing the stabilizer had a titer of $10^{3.7}$, whereas the titer of the control suspension had already on the 13th day fallen to an unmeasurable value.

Example 6.—Poliomyelitis virus type I/Mahoney at 4° C.

When the poliovirus suspension of the foregoing example was stored at 4° C., the following values were obtained:

Poliovirus with stabilizer after 84 weeks _____ $10^{7.161}$ $ID_{50}$/cc.
Poliovirus without stabilizer after 84 weeks _____ $10^{4.5}$ $ID_{50}$/cc.

Example 7.—Poliomyelitis virus type III/Leon 12 $a_1g$ (Sabin) at 20° C.

2.6% of the stabilizer of Example 1 (1.3 g.) were added to 50 cc. of a Sabin poliovirus type III/Leon $a_1b$ suspension and the whole was stored for 8 weeks at 20° C. After this time, the determination of the titer gave the following results:

Sabin poliovirus with 2.6% of stabilizer _____ $10^{5.74}$ $ID_{50}$/cc.
After 8 weeks _____ $10^{5.962}$ $ID_{50}$/cc.
Sabin poliovirus without stabilizer ____ $10^{5.74}$ $ID_{50}$/cc.
After 8 weeks _____ $10^{3.68}$ $ID_{50}$/cc.

Example 8.—Poliomyelitis vaccine for types I, II and III at 37° C.

100 cc. of an inactivated poliomyelitis vaccine containing all 3 types of poliovirus were stored for 14 days at 37° C. and then the antigenic activity (serum $ID_{50}$) was determined by tests with guinea pigs. 2.6 g. of the stabilizer used in Example 1 were added to another 100 cc. of this polio vaccine and then treated in the same manner. The following values were obtained:

|  | Type I | Type II | Type III |
|---|---|---|---|
| Polio vaccine | 16,320 | 49,152 | 4,480 |
| Polio vaccine with 2.6% of stabilizer after 14 days | 70,528 | 16,480 | 109,568 |
| Polio vaccine without stabilizer after 14 days | 0 | 0 | 0 |

Example 9.—Rickettsia fever antiserum 1,100 cc. of a 1.75% solution of the stabilizer of Example 1, dissolved in a 0.85% sodium chloride solution, were added to 100 cc. of a rickettsia fever antiserum. After dilution, this solution had a titer of about 1:100. The solution was then freeze-dried. After re-dissolution in distilled water, a solution was obtained that had a titer of complement binding antibodies of 1:80.

In contradistinction thereto, another rickettsia fever antiserum prepared analogously with a 0.85% sodium chloride solution had a titer of complement binding antibodies of 1:20.

Example 10.—Plasmin (A) A quantity of plasmin contained in 10 cc. of a 0.85% sodium chloride solution, having after solution a titer of 9,600 units per cc. and formed by the action of streptokinase on plasminogen, lost its potency during storage at 20° C. to the extent defined below (one internal plasmin unit being expressed by the quantity of plasmin which dissolves within 15 minutes a standard fibrin thrombus from 1 cc. of a 0.1% bovine fibrinogen solution).

| Incubation period | Plasmin activity in internal units per cc. | Activity in percent |
|---|---|---|
| 0 | 9,600 | 100 |
| 2 | 6,600 | 68.6 |
| 5 | 5,500 | 57.3 |

The above table shows that after 5 hours the plasmin activity was reduced by about one half.

In contradistinction thereto, the same quantity of plasmin in a 1.75% solution of the stabilizer used in Example 1, showed, when stored at 20° C., only a slight loss of activity, as is evidenced by the table hereunder. The data in this table also prove that the stabilizer added already exerted a stabilizing action during dissolution, since the plasmin activity amounted after dissolution in the 0.85% sodium chloride solution to 9,600 units per cc.

| Incubation period in hours at 20° C. | Plasmin activity in internal units per cc. | Activity in percent |
|---|---|---|
| 0 | 10,000 | 100 |
| 2 | 9,500 | 95 |
| 5 | 9,500 | 95 |

(B) For testing the stability of the plasmin activity of dilute solutions as those used for slow several hours lasting infusions to patients, the quantity of plasmin corresponding to 9,500 internal units was dissolved in 50 cc. of a 0.85% sodium chloride solution and another equal quantity was dissolved in 50 cc. of a 1.75% solution of the stabilizer used in Example 1; the activity was then determined at 20° C. after 2 and 5 hours. The following values were obtained:

| Plasmin activity in internal units per per 50 cc. in NaCl-solution | Effectiveness in percent, in NaCl-solution | Plasmin activity in internal units per 50 cc. in solution of stabilizer |
|---|---|---|
| Before dissolving | 9,500 | 100 | 9,500 |
| After dissolving | 8,250 | 87 | 9,500 |
| 2 hours after dissolving | 5,250 | 55.3 | 9,500 |
| 5 hours after dissolving | 3,450 | 76.3 | 9,500 |

The preparation lost a part of its potency already during dissolution and when the preparation was allowed to stand at 20° C., the decay of potency was stronger than in the foregoing comparative test carried out with a higher plasmin concentration. After 5 hours, only about one third of the activity could be determined. In contradistinction thereto, the stability did not change when using the stabilizer of Example 1, despite the high degree of dilution, during the whole test period.

*Example 11.—Streptokinase: dissolved*

100,000 internal units of streptokinase were dissolved in 500 cc. of a 3.5% solution of the stabilizer defined in Example 1. A corresponding batch was prepared as a control batch with a 0.85% solution of sodium chloride. Immediately after dissolution and after a standing for 2 and 6.5 hours at 20° C., samples were taken and the streptokinase activity of these samples was determined. The following values were obtained:

|  | Activity | | |
|---|---|---|---|
|  | After dissolving, percent | 2 hours after dissolving, percent | 6.5 hours after dissolving, percent |
| Streptokinase with stabilizer | 98 | 98 | 98 |
| Streptokinase without stabilizer | 78 | 70 | 57.5 |

At 20° C., the solution remained stable for at least 6.5 hours, which is about the time of a permanent drop infusion. The difference to the activity of the originally used batch, which was already observed after dissolving, was within the accuracy of measurement of the method used for determining the activity.

*Example 12.—Streptokinase: dry*

300 mg. of the stabilizer defined in Example 1 were added to 30 cc. of a streptokinase solution containing per cc. 250,000 of internal units. The solution thus obtained and a streptokinase solution with equal concentration but without stabilizer were filled in ampules of 1 cc. capacity, freeze-dried and stored at 37° C. The results of the activity tests are compiled in the following table.

| Streptokinase | Activity | |
|---|---|---|
|  | Without stabilizer, Percent | With stabilizer, Percent |
| After dissolving | 100 | 100 |
| After freeze-drying | 86 | 97 |
| After 3 weeks at 37° C | 83 | 88 |
| After 7 weeks at 37° C | 70 | 88 |
| After 26 w7eks at 37° C | 32 | 88 |

The above data show that the streptokinase was stabilized by the stabilizer when freeze-dried and even when stored for a period of more than a half a year at 37° C. The preparation without stabilizer was found to have after storage for 26 weeks at 37° C. only one third of its original activity whereas the preparation with stabilizer was found to have retained 88% of the original activity.

*Example 13.—Streptokinase: dry (with combined stabilizer)*

1 g. of sodium-L-glutaminate and 1 g. of the stabilizer defined in Example 1 were dissolved in 100 cc. of an aqueous streptokinase solution having an activity of 150,000 internal units per cc. This solution was filled in ampules having a capacity of 1 cc., freeze-dried and stored at 4° C. and at 37° C.

A streptokinase preparation was obtained which was found to be stable at 4° C. for at least one year. Even at temperatures of 37° C., the preparation retained its streptokinase activity for several months as is shown by the following table.

| Streptokinase | Activity | |
|---|---|---|
|  | Without stabilizer, Percent | With stabilizer, Percent |
| Dissolved | 100 | 100 |
| After freeze-drying | 88 | 98 |
| After 3 weeks at 37° C | 83 | 98 |
| After 8 weeks at 37° C | 65 | 98 |

The above values evidence that the streptokinase containing stabilizer retained its full activity even when stored for 8 weeks at 37° C.

*Example 14.—New-Castle disease virus*

100 cc. of New-Castle disease virus containing egg liquid were centrifuged for 1 hour at 17,500 rev. per minute and the New-Castle disease viruses, which were obtained as sediment, were then taken up in 100 cc. of a 3.5% solution of the gelatin degradation product crosslinked by means of hexamethylenediisocyanate and obtained according to Example 1 of German Patent 1,118,792.

1 cc. of this virus suspension was diluted with 225 cc. of physiological sodium chloride solution, and both virus suspensions were stored for 10 weeks at 4° C.

In corresponding manner, samples of the above-described New-Castle disease virus containing egg liquid, on the one hand in undiluted state, and, on the other hand, diluted at a ratio of 1:256 with physiological sodium chloride solution were stored for 10 weeks at 4° C.

In intervals of 1 week, samples were taken from the 4 suspensions and the hemagglutination units were determined by the hemagglutination test. The indicated hemagglutination titer (HA-titer) indicates the highest dilution of virus which still provokes agglutination of chicken erythrocytes. The dilution of 1:256 corresponds to the solution containing 4 hemagglutination units and used for the hemagglutination inhibition test which is the serological method of determination generally introduced in the diagnostic of the New-Castle disease. This dilution, which is generally used as solution for diagnosis should, therefore, be stable for a prolonged period of time, especially for comparative tests.

The results of the tests are compiled in the following table, the values of the suspension stored in diluted state having been multiplied by 256.

| Storage in weeks | Without stabilizer | | With stabilizer | |
|---|---|---|---|---|
|  | Undiluted | Diluted 1:256 | Undiluted | Diluted 1:256 |
| 1 | 1:1,024 | 1:1,024 | 1:1,024 | 1:1,024 |
| 2 | 1:1,024 | 1:1,024 | 1:1,024 | 1:1,024 |
| 3 | 1:1,024 | 1:512 | 1:1,024 | 1:1,024 |
| 4 | 1:1,024 | 1:512 | 1:1,024 | 1:1,024 |
| 5 | 1:512 | 1:512 | 1:1,024 | 1:1,024 |
| 6 | 1:512 | 1:512 | 1:1,024 | 1:1,024 |
| 7 | 1:256 | (²) | 1:1,024 | 1:1,024 |
| 8 | (¹) | (²) | 1:1,024 | 1:512 |
| 9 | (¹) | (²) | 1:1,024 | 1:512 |
| 10 | (¹) | (²) | 1:1,024 | 1:512 |

¹ Clear agglutination no longer observable.
² No agglutination.

The above data evidence that the hemagglutination of the undiluted suspension of New-Castle disease viruses, containing the stabilizer, remained unchanged for 10 weeks and the suspension diluted in a ratio of 1:256 remained unchanged for 7 weeks.

In contradistinction thereto, the hemagglutination of the undiluted New-Castle disease virus containing egg liquid fell after 5 weeks to half its original value and after 8 weeks a clear agglutination could no longer be determined. The egg liquid diluted in a ratio of 1:256 retained only for 2 weeks its full agglutination titer.

We claim:

1. A process for stabilizing biologically active material which comprises adding thereto 0.5 to 5.0 percent of modified collagen hydrolyzate containing cross-linking urea-alkylene-urea groups and having a molecular weight in the range of about 15,000 to 60,000.

2. A process as in claim 1 wherein said modified collagen hydrolyzate is a modified gelatin hydrolyzate.

3. A process as in claim 1 wherein 0.5 to 5.0 percent of sodium-L-glutamate is also added to said biologically active material.

4. A biologically active material stabilized with 0.5 to 5.0 percent of modified collagen hydrolyzate containing cross-linking urea-alkylene-urea groups and having a molecular weight in the range of about 15,000 to 60,000.

5. A stabilized material as in claim 4 wherein said modified collagen hydrolyzate is a modified gelatin hydrolyzate.

6. A stabilized material as in claim 4 which additionally contains 0.5–5.0 percent of sodium-L-glutamate.

References Cited

UNITED STATES PATENTS

| | | | |
|---|---|---|---|
| 2,166,074 | 7/1939 | Reichel | 167—78 |
| 3,057,782 | 10/1962 | Lindner et al. | 167—78 |

LEWIS GOTTS, *Primary Examiner.*

RICHARD HUFF, *Assistant Examiner.*